United States Patent Office 3,112,171
Patented Nov. 26, 1963

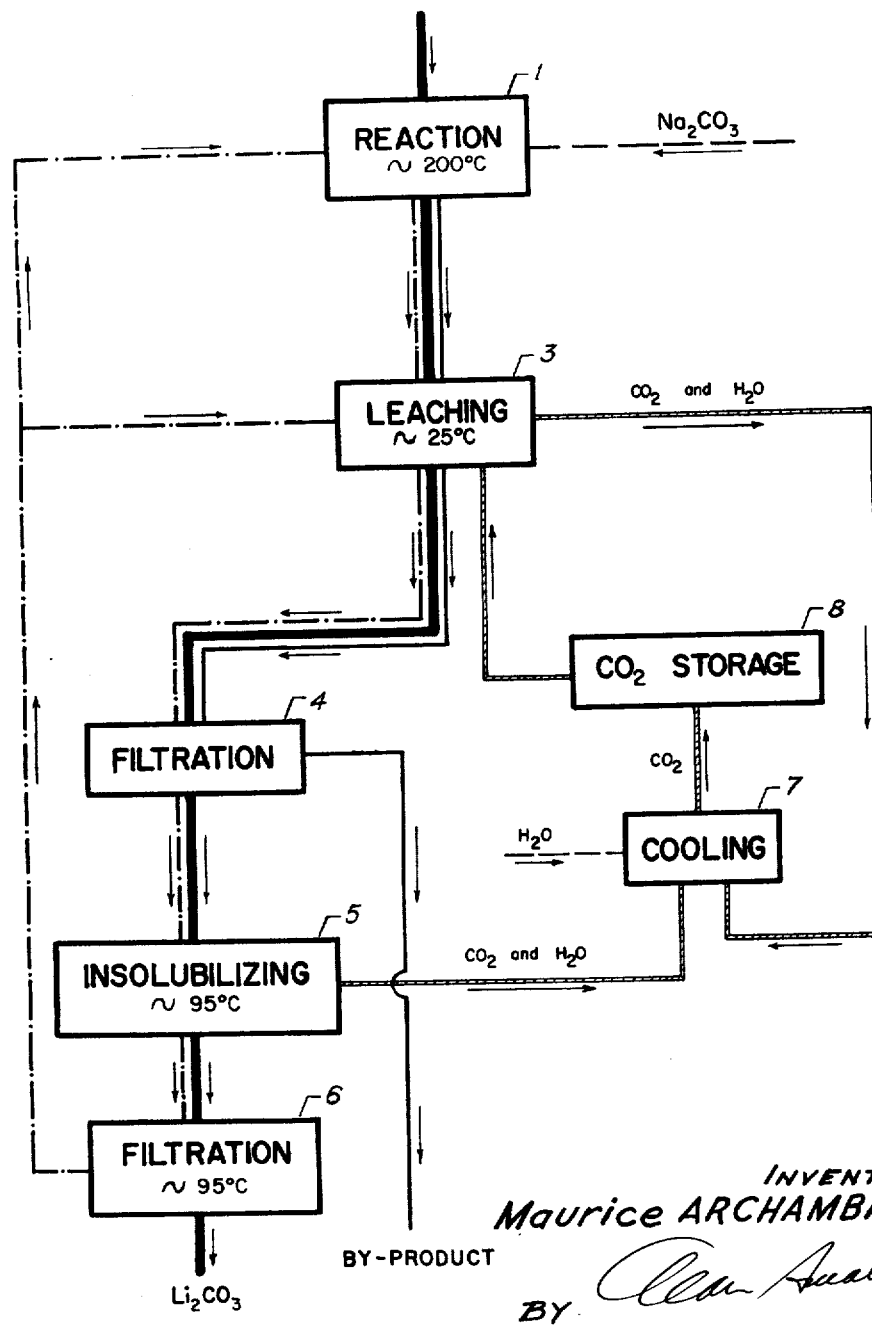

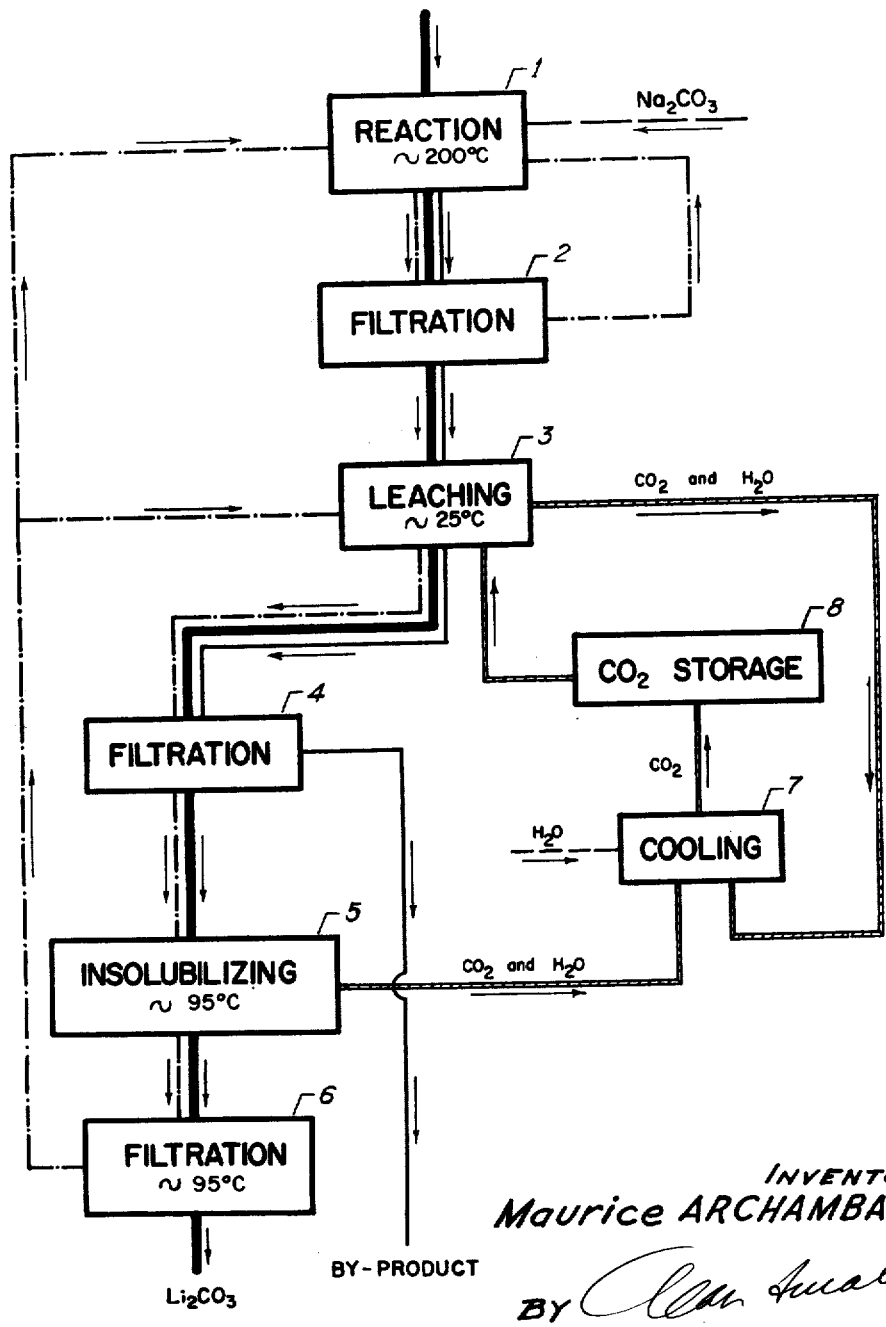

3,112,171
LITHIUM CARBONATE PRODUCTION
Maurice Archambault, Quebec, Quebec, Canada, assignor to Department of Natural Resources of the Province of Quebec, Quebec, Quebec, Canada
Filed Dec. 5, 1960, Ser. No. 73,679
Claims priority, application Great Britain Feb. 9, 1960
28 Claims. (Cl. 23—63)

This invention relates to the production of lithium carbonate from calcined lithium-bearing silicates, of which beta spodumene is a preferred species.

In order to achieve a satisfactory yield of lithium values, the decomposition of these silicates with alkali metal salts involves specific conditions, depending upon the particular alkali metal salt employed. The commercial processes for producing lithium salts generally do not act on the silicates directly with the alkali metal salts, but employ relatively drastic preliminary steps, for example, decomposition with sulphuric acid to form lithium sulfate and a discardable residue. The lithium sulfate is then converted to the carbonate, and then, if desired, to further end salts.

Recently, there has been a paper disclosure showing the treatment of spodumene with any sodium or calcium salt which is soluble or slightly soluble in water, to produce the corresponding lithium salt. That disclosure also states that extraction can best be obtained when the reacting solution contains sodium and hydroxyl ions, or sodium, calcium and hydroxyl ions and that the latter combination is preferable. The specific procedure given in the disclosure employs, for treatment, calcium chloride and sodium chloride to derive lithium chloride; sodium chloride followed by calcium hydroxide to form lithium chloride and lithium hydroxide; or sodium hydroxide and lime to form lithium hydroxide. Where lithium carbonate is desired, the lithium hydroxide resulting from the decomposing step is gassed with carbon dioxide.

In contrast to these procedures, the applicant has now found that beta spodumene can be reacted directly with aqueous sodium carbonate, and provided that a combination of critical conditions forming a part of this invention are observed, a good yield of lithium carbonate is obtained and is readily recovered by a straight-forward recovery procedure according to the invention. The applicant has further found that the addition of calcium salts in this decomposing step lowers the yield of extracted lithium and complicates the subsequent treatment.

More specifically, in accordance with the invention, beta spodumene or other appropriate lithium-bearing material is first reacted in a pressure vessel with from about 1 to 12 times, preferably from 1 to 6 times its weight, of aqueous sodium carbonate at an elevated temperature of at least 140° C. up to about 300° C., for time which varies from about 1 minute to about 1 hour, depending on the amount of carbonate used, the specific temperature and on the by-products desired. The amount of carbonate will vary depending upon the specific temperature.

This reaction results in an aqueous slurry containing lithium carbonate and sodium aluminosilicates, the composition of which may be regulated, according to the invention, by adjusting the amount of sodium carbonate used in conjunction with the specific conditions of the decomposition. The lithium salt is in good yield and in a form that can be recovered by a straight-forward procedure also forming a part of the invention, by which the selected by-products can also be recovered.

According to this procedure, the slurry is treated with cold water and enough carbon dioxide to saturate the resulting mixture at ambient atmosphere or super-atmospheric pressure. The total amount of water (water in slurry plus added water) should be from about 25 to about 70 times the lithium oxide present in the slurry, so as to dissolve the lithium values at a temperature from about 10° C. below zero to about 40° C. above. Then the final insoluble residue is separated from the solution containing the bicarbonate. The solution is then heated to a temperature within the range from about 60° C. to about 100° C. to insolubilize the lithium carbonate and to drive off the carbon dioxide as a gas.

The applicant believes that the failure of the prior art to suggest this relatively straight-forward procedure, i.e. the sole use of aqueous sodium carbonate (a) to decompose spodumene and (b) to precipitate lithium carbonate is possibly due to the fact that spodumene ores and concentrates are associated with quartz (free silica or potential silicic acid) which is known to react readily with a base as strong as aqueous sodium carbonate. One skilled in the art would therefore expect to encounter the following problems making the process appear impractical: (1) the formation of water-soluble sodium silicates, and the resulting difficulty of getting a lithium-bearing solution sufficiently free from impurities to permit easy or direct precipitation of a marketable lithium salt; (2) the production of lithium silicates and of complex lithium compounds which are still less slightly water-soluble than lithium carbonate, the consequent drawback of being forced to use huge amount of water to dissolve these nearly insoluble salts, and subsequently the enormous caloric expenditure required to precipitate the lithium salt desired and to concentrate the mother liquor prior to its reuse in the circuit; (3) the formation of highly retentive products of reaction, especially when the spodumene is reacted with a large excess of sodium carbonate, and the resulting serious filtering and washing difficulties encountered.

These difficulties apparently led the prior art to the use of combinations of sodium and calcium salts. The applicant has found that these combinations deteriorate the decomposing action of aqueous sodium salt and merely serve to complicate the process, without helping in actual extraction.

In the applicant's process, in contradistinction with those of the prior art, carbon dioxide is never used to precipitate the lithium. The following functions are assigned here to carbon dioxide at the leaching step: first, it is used to dissolve the lithium carbonate in the form of the more soluble bicarbonate, thus permitting the use of smaller amounts of leaching solution; second, carbon dioxide is used to convert into lithium bicarbonate any insoluble lithium silicates or complex lithium compounds that may have formed, while concomitantly preventing any contaminating impurities that were part of the former lithium silicates or complex compounds from going into solution; third, carbon dioxide is used to prevent the soluble sodium silicates that may have formed, from contaminating lithium-bearing solution by transforming said silicate into soluble bicarbonate and insoluble silica. By so doing, a solution is produced from which pure lithium carbonate can be directly and readily obtained.

DETAILED DESCRIPTION-PROCESS

The invention has been generally described and it will now be explained in further detail by reference to satisfactory apparatuses and procedures which are illustrated in the accompanying drawings, in which:

FIGURE 1 is a flow-diagram which may be adopted when a low excess of sodium carbonate is used.

FIGURE 2 is a flow-diagram which may be adopted when a large excess of sodium carbonate is used.

Referring to FIGURE 1, a preheated mixture of comminuted beta spodumene, water and sodium carbonate—the sodium carbonate being in small excess, for example 20 percent—is fed to a pressure vessel, preferably a continuous autoclave (step 1) and is digested under pressure at 200° C. for approximately 1 hour, during which time the mixture is thoroughly stirred. The aqueous reaction product is charged to a bicarbonating tower (step 3) where the temperature of the slurry is lowered through cooling and/or adding cold water or a cooled solution obtained from the filtration step 6. This slurry is then treated with carbon dioxide gas. The amount of water or of solution, as the case may be, is added according to the amount of lithium carbonate present and to the temperature at which the treatment is effected.

The temperature of this tower is kept at about 25° C. or at room temperature and the progress of the bicarbonation is followed by the pH measurements of the solution. The solids are then separated from the solution through filtration or by any other suitable means (step 4); the solids are stockpiled as marketable by-product, while the solution containing the extracted lithium together with the unspent sodium carbonate is heated (insolubilizing step 5). The insolubilizing is effected at a temperature approaching the boiling temperature of the solution and preferably, while stirring. This thermal treatment causes the carbon dioxide to evolve and the lithium carbonate to precipitate. The evolved carbon dioxide is then dried (step 7) and collected in the carbon dioxide storage tank 8. The resulting slurry is directed to a filtration or preferably to a centrifugation (step 6) where the lithium carbonate is separated from the solution while still hot. The lithium carbonate thus produced is dried and marketed, while the mother liquor is partly used at the reaction (step 1) and partly at the leaching (step 3) as previously mentioned.

Referring now to FIGURE 2, when a large excess (for example, 100%), of sodium carbonate over the stoichiometric amount required for the lithium oxide present is used; the discharged slurry from reaction 1 is immediately filtered (step 2) when still hot. The solution is returned to step 1 to react with untreated spodumene while the solids are leached (step 3) with added cold water or cooled solution from step 6 and treated with carbon dioxide at around 25° C. This bicarbonated slurry is subsequently filtered (step 4) to separate the solids from the solution; the solution is then heated up to about 95° C., while stirring, to insolubilize crystalline lithium carbonate (step 5) and to evolve carbon dioxide gas as previously described (FIGURE 1) and the liquor is reused for the primary reaction (step 1) or for the leaching step 3.

It is well understood that other ways of proceeding can be adopted and any modifications of these flowsheets or conditions of operation are only good engineering.

In the drawings the thick solid line represents the flow of lithium, the thin solid line—the flow of spent sodium, the chain line—the circuit of solutions, and the hatched line—the circuit of carbon dioxide.

STARTING MATERIALS

The lithium-bearing minerals that are particularly amenable to treatment by the applicant's process are the following:

(1) Spodumene: $Li_2O.Al_2O_3.4SiO_2$
(2) Petalite: $Li_2O.Al_2O_3.8SiO_2$
(3) Eucryptite: $Li_2O.Al_2O_3.2SiO_2$
(4) Lepidolite or lithium-mica
    $(Li,K,Na)_2Al_2(SiO_3)_3(F,OH)_2$ Before being treated, the above mentioned silicates require a calcining treatment at temperatures of which the minima vary according to the minerals, from about 680° C. to about 980° C., to cause their crystal lattice to change or their dissociation to occur.

For spodumene, the modification is known to take place at about around 870° C., and to be only a change in the crystalline structure; this calcined spodumene is called beta spodumene.

For petalite, the heating to about 680° C., is known to cause its dissociation to beta spodumene and free silica.

For eucryptite, heating to around 980° C., produces its conversion from trigonal structure to a new allotropic form, called the hexagonal form.

For lepidolite, heating to about 850° C., is known to cause the evolution of its volatile elements (F and OH) and its breaking down to para-lepidolite which is a mixture of beta spodumene, nephelite and leucite.

BY-PRODUCTS OF TREATMENT

The solid residue left after lithium values are extracted by the applicant's process is essentially constituted of one or a few of the following complex sodium silicates:

(1) An anhydrous sodium aluminosilicate, jadeite-like, in chemical composition: $(Na_2O.Al_2O_3.4SiO_2)$
(2) An isometric zeolite: $(Na_2O.Al_2O_3.4SiO_2.xH_2O)$
(3) An anisometric zeolite: $(Na_2O.Al_2O_3.2SiO_2.yH_2O)$
(4) A sodic cancrinite, approximating:

$$(3Na_2O.4Al_2O_3.9SiO_2.2Na_2CO_3.3H_2O)$$

The preferential production of one or the other of these silicates is possible—their relative production being controlled by proper adjustment of operating conditions.

All of these residual silicates are of potential values for the industry, although to varying degrees.

THE DECOMPOSING STEP

Conditions and Chemical Required

In the decomposing step, the only chemical consumed by the process is sodium carbonate $(Na_2CO_3)$ often called "soda ash" and sometimes "normal carbonate." This carbonate is used with water at various temperatures. In the decomposition of the lithium-bearing silicates, the following factors are interdependent and critical: amounts of sodium carbonate, proportions of water, temperatures and time of reaction.

As the reaction is of hydrothermal nature, relative and respective quantities of water and sodium carbonate are considered: they vary with time and temperature of reaction. The amount of $Na_2CO_3$ to be added is a function of the lithium oxide content of the lithium-bearing charge; it varies also with the type of sodium aluminosilicate that is desired as end product. As little as one mole (106) of $Na_2CO_3$ may be used with success for each mole (30) of the $Li_2O$ contained in the material to be reacted. However, a larger amount of $Na_2CO_3$ which is required to produce anisometric sodic zeolite or sodic cancrinite will hasten the reaction; up to about 8 moles of $Na_2CO_3$ for one mole of $Li_2O$ might be employed.

The amount of water in the reacting mixture may vary within proportions from 1:1 to 10:1 by weight of the lithium-bearing charge. Other factors being constant, a change in the amount of water may affect the recovery of lithium and the composition of the end products. Water has not only a physical or mechanical effect, but may take part in the reaction, as previously shown by the composition of the hydrated sodium aluminosilicates that are formed.

In practice, the time of the reaction may be from about one minute to about one hour, depending on the temperature and, on the excess of reactant and on the ratio of water to the lithium-bearing material to be treated.

The pressure inside the reactor increases according to the temperature and is practically corresponding to the water vapor pressure of the solution. The temperature should range from about 140° C. to about 300° C., but preferred temperatures are from about 140° C. to about 250° C.

The pressure corresponding to such temperature ranges would be from about 50 to about 1250 p.s.i.g. for the first range, and from about 50 to about 600 p.s.i.g. for the second range.

Actually, the reaction is only carried out under pressure as a means of keeping the water in the liquid phase, and consequently, the pressure will vary according to other conditions of the reaction.

As mentioned previously, four different by-products may be obtained.

When the anhydrous sodium aluminosilicate, jadeite-like in chemical composition, is the by-product desired, the beta spodumene or the calcined lithium-bearing silicate is contacted with sodium carbonate in an amount ranging from about 3.5 to about 7 times the weight of the lithium oxide present (i.e. approximately one to two moles of $Na_2CO_3$ per mole of $Li_2O$), in the presence of water in an amount from about 1 to about 1.6 times the weight of the lithium-bearing material, at a temperature from about 150° C. to about 180° C., for from about 35 to about 50 minutes.

When the isometric sodic zeolite is sought for, as a by-product, the beta spodumene is contacted with sodium carbonate in an amount from about 3.5 to about 7 times the weight of the lithium oxide present, in the presence of water in an amount from about 1.3 to about 2.3 times the weight of the lithium-bearing material, at a temperature from about 185° C. to about 250° C., for from about 10 minutes to about 60 minutes.

When anisometric sodic zeolite is the desired by-product, the calcined lithium-bearing silicate is contacted with sodium carbonate, in an amount in the range from about 7 to about 14 times the weight of the lithium oxide present (i.e. approximately two to four moles of $Na_2CO_3$ per mole of $Li_2O$), in the presence of water in an amount from about 1.3 to about 2 times the weight of the lithium-bearing material, at a temperature from about 140° C. to about 175° C., and for from about 5 minutes to about 60 minutes.

When sodic cancrinite is sought for, the beta spodumene is contacted with sodium carbonate, in an amount from about 14 to about 29 times the weight of the lithium oxide present, in the presence of water, in an amount from about 2.0 to about 7 times the weight of the lithium-bearing material, at a temperature within the range from about 185° C. to about 200° C., and for from about 1 minute to about 10 minutes.

When anisometric sodic zeolite and sodic cancrinite are formed, there is enough concomitant production of alkali metal salts of silicic acids to favour side reactions that would render the filtration very difficult and the extraction of the lithium values practically impossible, if the leaching solution was not a saturated aqueous carbon dioxide solution.

Considering the matter from a sodium carbonate consumption standpoint only, it seems that, generally, the most desirable by-product to aim at is the isometric zeolite. However, certain conditions may be met where the other by-products would be advantageously produced.

When isometric zeolite is the desired by-product, the optimum conditions are generally met with an amount of sodium carbonate 10 to 70% in excess over the theoretical amount required, the temperature being at about 200° C., for an amount of water 1.6 times the amount of the material charged in the autoclaves, with a time of reaction not over one hour.

Calcined lepidolite, petalite and eucryptite would behave essentially like beta spodumene, giving the same reaction products as those mentioned above.

LEACHING AND INSOLUBILIZING

The solubilizing of the lithium values is advantageously performed at room or colder temperature with cold water saturated with carbon dioxide or with a cooled unsaturated $Li_2CO_3$ solution (from a previous operation) through which carbon dioxide gas is diffusing.

The amount of carbon dioxide circulated at the leaching step varies basically according to the temperature, the pressure, the strength and the volume of the leaching solution, in a manner known to those skilled in the art.

The lower the temperature, the greater the solubility of the lithium bicarbonate thus formed. The greater the carbon dioxide concentration in the leach solution, the faster is the leaching and the smaller is the amount of water required for solubilizing the lithium values.

For example, when the leaching water is kept saturated with carbon dioxide at atmospheric pressure, the amount required for solubilizing the lithium values is in the range from about 35 to about 70 times the weight of the lithium oxide contained in the charge, for a temperature from about 0° C. to about 40° C.

On the other hand, when the leaching water is kept saturated with carbon dioxide at a pressure of about 150 p.s.i.g. the amount required is from about 25 to about 50 times the weight of the lithium oxide contained in the charge, for a temperature from about 10° C. below zero to about 20° C. above.

In practice, the whole product of the primary reaction or the solids from said product is diluted with water or with the mother liquor obtained after the $Li_2CO_3$ insolubilizing step. Carbon dioxide is diffused through the slurry, at ambient atmosphere or at superatmospheric pressure, the excess $CO_2$ being collected and recirculated.

After its separation from the solid residue, the pregnant solution is warmed up, thereby causing the formation of solid lithium carbonate, which was preceded by evolution of carbon dioxide gas, which is collected and returned to the process for leaching new lithium carbonate from the autoclave reaction product. Any temperature between about 60° C. and about 100° C. is suitable for satisfactory $Li_2CO_3$ insolubilisation. Of course, the higher the temperature, the faster the insolubilizing but the finer the size of the lithium carbonate crystals.

Instead of heating the solution to insolubilize the lithium carbonate, physical means, such as beating, ultrasonic irradiation, and vacuum may be resorted to or used jointly. This applies especially when leaching is done at low temperature and under pressure of $CO_2$.

The applicant has found that, even if the $Li_2CO_3$ formed in the autoclave would be expected to precipitate, contrarily to this expectation, no trouble of any kind such as scaling, caking, pipe plugging, etc. has occurred either in the autoclave or any parts of the complete system.

For the purpose of giving further details to illustrate the invention, the applicant furnishes the following examples of preferred procedures. All parts mentioned in the examples are by weight.

EXAMPLE 1

One hundred parts of calcined or beta spodumene concentrate analysing 5.25% $Li_2O$ (corresponding to a mixture of about 70% spodumene, 15% quartz and 15% feldspars), together with 29 parts of $Na_2CO_3$ (70% excess) and 120 parts of water were treated within an autoclave. The temperature of the reaction was 200° C. and the time: one hour. After the reaction, the mixture from the autoclave was filtered and the mother liquor returned to the process (cf. FIGURE 2, steps 1 and 2). Then the solid was leached at 25° C. with 340 parts of a cooled aqueous solution, previously saturated with $Li_2CO_3$ at around 95° C., through this slurry $CO_2$ was circulated; this leaching operation lasted one hour at 25° C. (FIGURE 2, step 3). The solution was separated by filtration from the solid and then heated to evolve $CO_2$ gas and insolubilize $Li_2CO_3$: Analysis of the lithium oxide in the residue was found to be 0.32%, which means an extraction yield of about 94%. The by-product was essentially an isometric sodic zeolite, i.e. an hydrated sodium aluminosilicate.

EXAMPLE 2

100 parts of same calcined concentrate as in Example 1 were charged into an autoclave with 18 parts of $Na_2CO_3$ (i.e. 5% under the stoichiometric amount required) and 160 parts of water. The temperature was raised up to 245° C., corresponding to a pressure of about 500 p.s.i. and maintained there for 15 minutes. After treatment in the autoclave, the slurry was diluted with 350 parts of a cooled aqueous $Li_2CO_3$ solution previously saturated at around 95° C., and then leached at around 25° C., for one hour, while bubbling carbon dioxide gas through the leaching solution. After filtration, the solution was heated to about 95° C., causing the evolution of $CO_2$ gas and the formation of crystalline $Li_2CO_3$ which was recovered by filtration to the extent of 91.5% of the lithium charged in the autoclave. The residue was of the same zeolitic nature as in previous example.

EXAMPLE 3

One hundred parts of calcined spodumene concentrate containing 4.5% $Li_2O$ (and corresponding to a mixture of about 60% spodumene, 25% feldspars and 15% quartz) were reacted in a pressure vessel with 21 parts of $Na_2CO_3$ (30% excess) and 135 parts of water. The mixture was heated to around 235° C., or 400 p.s.i. and held there for 15 minutes. Then the temperature was lowered and the pulp flushed out at pressure of about 100 p.s.i. The mixture from the autoclave was leached at room temperature for one hour with 260 parts of cold aqueous $Li_2CO_3$ solution from a previous precipitation and under a current of $CO_2$. The slurry was then filtered and the solution heated to recover $CO_2$ as a gas and $Li_2CO_3$ as a solid. Lithium recovery was 92.5%. The analysis of the lithium carbonate as obtained on the filter, without any washing gave:

|  | Percent |
| --- | --- |
| $Li_2CO_3$ | 99.85 |
| $Na_2CO_3$ | 0.12 |
| $SiO_2$ | 0.03 |
| $R_2O_3$ | 0.00 |

Here again, the solid residue has shown to be essentially an isometric sodic zeolite of the same nature as in previous examples.

EXAMPLE 4

Over two dozen complete consecutive cyclings were effected in accordance with the flowsheet of the process as on FIGURE 1. Those reactions lasted for one hour and were made at 200° C., with 10% excess of $Na_2CO_3$ and 1.6 parts of water for 1 part of calcined spodumene concentrate. Lithium recoveries run between 92 and 94% while the $Li_2CO_3$ obtained was always over 99% pure. The solid residues obtained as by-products were all the time isometric sodic zeolite.

EXAMPLE 5

100 parts of the same concentrate as in Example 3 were heated in an autoclave with 79 parts of sodium carbonate ($Na_2CO_3$—400% excess) and 200 parts of water at 160° C. for thirty minutes. The product therefrom was leached with water plus $CO_2$ at room temperature. After leaching and filtration the obtained insoluble residue contained 0.40% lithium oxide which means an extraction yield of 91%. This residue was mostly an anisometric sodic zeolite.

EXAMPLE 6

100 parts of the same concentrate as in Example 3 were heated in a pressure vessel with 127 parts of sodium carbonate ($Na_2CO_3$—700% excess) and 200 parts of water at 200° C. for about 1 minute. The product therefrom was leached with water and $CO_2$ at room temperature. After leaching and filtration the obtained insoluble residue contained 0.00% lithium oxide which means a yield of 100%. This residue was mostly a sodic cancrinite.

EXAMPLE 7

A lepidolite concentrate ground to pass a 150 mesh screen was calcined at 930° C. One hundred parts of this calcined lepidolite was contacted for 1 hour at 200° C. in an autoclave together with 24 parts of sodium carbonate and 160 parts of water. The leaching of the reaction product was performed at room temperature with 200 parts of water saturated with carbon dioxide. The lithium extraction yield was 85%.

PRIOR ART EXAMPLES

*Joint Action of Sodium and Calcium Salts*

EXAMPLE 1

One hundred parts of a concentrate similar to the one used for Example 3 were heated for 1 hour at 200° C. in a pressure vessel with 7.9 parts of sodium carbonate plus 7.4 parts of calcium carbonate and 160 parts of water. Each salt added was in an amount representing 50% of the stoichiometric amount required for the $Li_2O$ present. After reaction, the product was leached, at around 25° C., with an amount of water in excess over that required for complete solubilization of the lithium carbonate formed. The lithium recovery was 58%. This result indicates that the addition of calcium carbonate does not improve the efficiency of sodium carbonate. In the solid residue (an isometric sodic zeolite), no newly formed albite or anorthite was detected.

EXAMPLE 2

One hundred parts of the concentrate used in the preceding example were agitated for 1 hour at 200° C. in a pressure vessel with 15.9 parts of sodium carbonate plus 11 parts of calcium hydroxide and 160 parts of water. The sodium and calcium salts in this case were added approximately in equimolecular proportions, each salt being present in stoichiometric amounts for the lithium of the charge. After reaction, the slurry was filtered to remove the mother liquor and the solid material was leached with water as follows: a first leaching was effected for 50 minutes at room temperature, while stirring, with 900 parts of water; this way, 33% of the lithium was extracted. A second leaching performed with 2000 parts of water at room temperature for 50 minutes and while stirring increased the above extraction by only 2%. Both leaching tests resulted in slurries which were very difficult to filter. In the solid residue, no newly formed albite or anorthite was detected.

The applicant claims:

1. A process for extracting lithium values from a calcined lithium-bearing silicate, comprising reacting said silicate hydrothermically with water and sodium carbonate in a total amount less than about 12 times the weight of said calcined lithium-bearing silicate, said carbonate being present in an amount of at least about 1 mole of sodium carbonate per mole of lithium oxide to the point where substantially all the lithium in the silicate has been converted directly to the carbonate thereby producing a mixture containing solid lithium carbonate and sodium aluminosilicate, and separating the lithium carbonate from the sodium aluminosilicate.

2. A process, as defined in claim 1, in which the water and sodium carbonate are employed in a total amount of less than about 6 times the weight of the calcined lithium-bearing silicate.

3. A process, as defined in claim 1, in which the reaction is carried out at a temperature within the range from about 140° C. to about 300° C. and the water and sodium carbonate are present in a total amount of less than about 6 times the weight of the calcined lithium-bearing silicate.

4. A process, as defined in claim 1, in which the calcined lithium-bearing silicate is beta spodumene.

5. A process, as defined in claim 1, wherein the lithium-bearing silicate is a mineral selected from the group consisting of spodumene, petalite, eucryptite and lepidolite, which have been calcined to transformation temperature.

6. A process for extracting lithium carbonate from calcined lithium-bearing silicate, comprising, reacting said silicate at a temperature in the range from about 140° C. to about 300° C. with from about 1 to about 12 times the weight of said silicate of aqueous sodium carbonate, the amount of water present being within the range of from about 1 to about 7 times the weight of the lithium-bearing silicate to produce a mixture containing lithium carbonate and sodium aluminosilicate, and separating the lithium carbonate from the aluminosilicate.

7. A process for extracting lithium carbonate from calcined lithium-bearing silicate, comprising, reacting the silicate under pressure and at a temperature within the range from about 150° C. to about 180° C. with sodium carbonate in amount from about 3.5 to about 7 times the weight of the lithium oxide present in the starting silicate and in the presence of water in an amount from about 1 to about 1.6 times the weight of the silicate, for a time from about 35 minutes to about 50 minutes, thereby producing a mixture containing lithium carbonate and an anhydrous sodium aluminosilicate, and separating the lithium carbonate from the aluminosilicate.

8. A process for extracting lithium carbonate from calcined lithium-bearing silicate, comprising, reacting the silicate under pressure and at a temperature within the range from about 185° C. to about 250° C. with sodium carbonate in amount from about 3.5 to about 7 times the weight of the lithium oxide present in the lithium-bearing silicate, in the presence of water in an amount from about 1.3 to about 2.3 times the weight of the silicate, for a time from about 10 minutes to about 60 minutes, thereby producing a mixture containing lithium carbonate and isometric sodic zeolite and separating the lithium carbonate from the isometric sodic zeolite.

9. A process for extracting lithium carbonate from calcined lithium-bearing silicate, comprising, reacting the silicate under pressure and at a temperature within the range from about 140° C. to about 175° C. with sodium carbonate in amount from about 7 to about 14 times the weight of the lithium oxide present in a solution containing water in an amount from about 1.3 to about 2.0 times the weight of the silicate, for a time from about 5 minutes to about 60 minutes, thereby producing a mixture containing lithium carbonate and anisometric sodic zeolite and separating the lithium carbonate from the anisometric sodic zeolite.

10. A process for extracting lithium carbonate from calcined lithium-bearing silicate, comprising, reacting the silicate under pressure and at a temperature within the range from about 185° C. to about 200° C. with sodium carbonate in amount from about 14 to about 29 times the weight of the lithium oxide present in a solution containing water in an amount from about 2.0 to about 7 times the weight of the silicate, for a time from about 1 minute to about 5 minutes, thereby producing a mixture containing lithium carbonate and sodic cancrinite and separating the lithium carbonate from the sodic cancrinite.

11. A process for producing lithium carbonate from calcined lithium-bearing silicate, comprising, reacting said silicate under pressure with aqueous sodium carbonate in an amout exceeding the stoichiometric proportion by not more than about 100 percent, the water being in an amount from about 1 to about 2.3 times the weight of the lithium-bearing silicate, at a temperature from about 140° C. to about 250° C., for from about 5 minutes to about 1 hour, to produce a mixture containing lithium carbonate and a sodium aluminosilicate selected from the group consisting of isometric sodic zeolite and a sodic compound having the chemical composition of jadeite and separating the lithium carbonate from the sodium aluminosilicate.

12. A process for producing lithium carbonate from calcined lithium-bearing silicate, comprising, reacting said silicate under pressure at a temperature from about 140° C. to about 200° C. with from about 2 to about 12 times the weight of said silicate of water and sodium carbonate in which the carbonate is present in an amount from about 7 to about 29 times the weight of the lithium oxide present in the lithium-bearing silicate, for from about 1 minute to about 60 minutes producing thereby a mixture containing lithium carbonate and a sodium aluminosilicate selected from the group consisting of anisometric sodic zeolite and sodic cancrinite and separating the lithium carbonate from the sodium aluminosilicate.

13. A process, as defined in claim 7, in which the calcined lithium-bearing silicate is beta spodumene.

14. A process, as defined in claim 7, in which the lithium-bearing silicate is a mineral selected from the group consisting of spodumene, petalite, eucryptite and lepidolite which have been calcined to transformation temperature.

15. A process, as defined in claim 10 in which the calcined lithium-bearing silicate is beta spodumene.

16. A process, as defined in claim 10, in which the lithium-bearing silicate is a mineral selected from the group consisting of spodumene, petalite, eucryptite and lepidolite which have been calcined to transformation temperature.

17. A process for extracting lithium values from a calcined lithium-bearing silicate, comprising, reacting said silicate at a temperature within the range from about 140° C. to about 300° C. with sodium carbonate in an amount of at least about one mole per mole of lithium oxide present in the silicate and in the presence of water in an amount not more than about seven times the weight of the lithium-bearing silicate to produce a mixture containing lithium carbonate and a sodium aluminosilicate, cooling the mixture, subjecting the cooled mixture to the action of carbon dioxide to solubilize the lithium, and separating the resulting lithium solution from the remaining solid residue.

18. A process, as defined in claim 17, in which the mixture is cooled to a temperature from about 10° C. below zero to about 20° C. above zero, the pressure of the carbon dioxide treatment is within the range up to about 150 p.s.i.g. the amount of solution is within the range from about 25 to about 50 times the weight of the lithium oxide present in the lithium-bearing charge.

19. A process for extracting lithium carbonate from calcined lithium-bearing silicate, comprising, reacting said silicate at a temperature in the range from about 140° C. to about 300° C. with from about 1 to about 12 times the weight of said silicate of aqueous sodium carbonate, the amount of water present not exceeding seven times the weight of the lithium-bearing silicate producing thereby a mixture containing lithium carbonate and sodium aluminosilicate, cooling the mixture to a temperature from about 10° C. below zero to about 20° C. above zero treating at said temperature the cooled mixture with aqueous carbon dioxide at a pressure within the range up to 150 p.s.i.g., the resulting lithium solution being in an amount from about 25 to about 50 times the weight of the lithium oxide present in the lithium-bearing charge.

20. A process for extracting lithium carbonate from calcined lithium-bearing silicate, comprising, reacting said silicate at a temperature in the range from about 140° C. to about 300° C. with from about 1 to about 12 times the weight of said silicate of aqueous sodium carbonate, the amount of water present not exceeding seven times the weight of the lithium-bearing silicate producing thereby a mixture containing lithium carbonate and sodium aluminosilicate, cooling the mixture, subjecting the cooled mixture to the action of carbon dioxide under pressure to form and dissolve lithium bicarbonate, and separating the resulting lithium bicarbonate solution from the solid residue.

21. A process for extracting lithium from calcined lithium-bearing silicate comprising reacting said silicate under pressure and hydrothermal conditions with aqueous sodium carbonate in a weight ratio of about 3.5 to 29 times the weight of the lithium oxide present in the silicate, water being present in an amount not exceeding seven times the weight of the silicate, thereby to produce a mixture containing hot water-insoluble lithium carbonate and sodium aluminosilicate, cooling the mixture, subjecting the cooled mixture to the action of carbon dioxide to form lithium bicarbonate and to leach the same, then decomposing the lithium bicarbonate solution by physical means so as to cause evolution of carbon dioxide and insolubilization of the lithium carbonate, separating the lithium carbonate from the mother liquor and recycling the latter to the process, and returning the carbon dioxide to the leaching step.

22. A process for extracting lithium from calcined lithium-bearing silicate comprising reacting said silicate under pressure and hydrothermic conditions with aqueous sodium carbonate in a weight ratio of about 3.5 to 29 times the weight of the lithium oxide present in the silicate, water being present in an amount not exceeding seven times the weight of the silicate, to produce an aqueous liquor containing solid lithium carbonate and solid sodium aluminosilicate, separating the solids from the hot mother liquor and returning the latter to the process, adding water to the solid residue in an amount from about 35 to about 70 times the weight of the lithium oxide contained in the charge, saturating the resulting mixture with carbon dioxide at a temperature from about 0° C. to about 40° C. thereby to form lithium bicarbonate and to leach the same, separating the leached solid residue from the lithium bicarbonate solution, heating the solution to a temperature within the range from about 60° C. to about 100° C. to drive off carbon dioxide and to insolubilize crystalline lithium carbonate, recovering said carbonate from the mother liquor and returning the latter to the process, and recycling the carbon dioxide to the leaching step.

23. A process for extracting lithium from calcined lithium-bearing silicate comprising reacting said silicate under pressure and hydrothermal conditions with water and sodium carbonate in a weight ratio of about 3.5 to 29 times the weight of the lithium oxide present in the silicate, water being present in an amount not exceeding seven times the weight of the silicate, to produce a mixture containing hot water-insoluble lithium carbonate and sodium aluminosilicate, cooling the mixture, adding water to the mixture in an amount from about 35 to about 70 times the weight of the lithium oxide of the charge, saturating the resulting mixture with carbon dioxide at a temperature from about 0° C. to about 40° C. thereby to form lithium bicarbonate and to leach the same, separating the leached solid residue from the lithium bicarbonate solution, heating the solution to a temperature within the range from about 60° C. to about 100° C. to drive off carbon dioxide and to insolubilize crystalline lithium carbonate, recovering the lithium carbonate from the mother liquor and returning the latter to the process, and recycling the carbon dioxide to the leaching step.

24. A continuous cyclic process for producing lithium carbonate and a sodium aluminosilicate directly from calcined lithium-bearing silicate, which comprises the steps of continuously decomposing lithium-bearing silicate by contact with aqueous sodium carbonate in a weight ratio of about 3.5 to 29 times the weight of the lithium oxide present in the silicate, water being present in an amount not exceeding seven times the weight of the silicate, thereby to form a mixture containing hot-water insoluble lithium carbonate and a sodium aluminosilicate, cooling the mixture, leaching said cooled mixture with aqueous carbon dioxide to form a lithium bicarbonate solution containing a solid aluminosilicate residue, separating the solid residue from the solution, insolubilizing the lithium content of the solution by heating and agitating the solution to drive off carbon dioxide gas and to reform crystalline lithium carbonate, recovering the solid lithium carbonate from the mother liquor, returning the mother liquor to the process and recycling the carbon dioxide to the leaching step.

25. A cyclic process for producing lithium carbonate and sodium aluminosilicate directly from calcined lithium-bearing silicate which comprises the steps of:

(a) decomposing said silicate at a temperature in the range from about 140° C. to about 300° C., under pressure with from about 1 to about 12 times the weight of said silicate of water and sodium carbonate, said salt being in an amount from about 3.5 to about 29 times the weight of the lithium oxide present in the silicate, in the presence of water in an amount from about 1 to about 10 times the weight of the silicate, and for from about 1 minute to about 1 hour to form a hot mixture containing solid lithium carbonate and sodium aluminosilicate by-product;

(b) cooling said mixture;

(c) leaching the cooled mixture at a temperature from about 10° C. below zero to about 40° C. above with aqueous carbon dioxide at at least atmospheric pressure;

(d) separating the leached solid residue from the lithium bicarbonate-bearing solution;

(e) insolubilizing the lithium bicarbonate solution obtained in the leaching step by heating and agitating said solution to drive off carbon dioxide gas;

(f) separating resultant crystalline lithium carbonate from the mother liquor and returning the latter to the process;

(g) recovering separately lithium carbonate and sodium aluminosilicate; and (h) recycling to the leaching step the carbon dioxide driven off in the insolubilizing step.

26. A process for solubilizing and purifying lithium carbonate from a mixture thereof with sodium aluminosilicate, comprising, subjecting said mixture in cold aqueous conditions to the action of carbon dioxide thereby to leach lithium and separating the lithium solution from the remaining solid residue.

27. A process, as defined in claim 26, in which the leaching is carried out under pressure at a temperature within the range from about 10° C. below zero to about 29° C. above zero, and the carbon dioxide pressure is maintained within the range up to about 150 p.s.i.g.

28. A process, as defined in claim 26, in which the amount of aqueous carbon dioxide is within the range from about 25 to about 50 times the weight of the lithium oxide present in the lithium-bearing charge.

References Cited in the file of this patent

UNITED STATES PATENTS

| | | |
|---|---|---|
| 2,413,644 | Nicholson | Dec. 31, 1946 |
| 2,924,507 | Peterson | Feb. 9, 1960 |

FOREIGN PATENTS

| | | |
|---|---|---|
| 596,302 | Canada | Apr. 19, 1960 |

UNITED STATES PATENT OFFICE
CERTIFICATE OF CORRECTION

Patent No. 3,112,171 November 26, 1963

Maurice Archambault

It is hereby certified that error appears in the above numbered patent requiring correction and that the said Letters Patent should read as corrected below.

In the grant, lines 2 and 3, for "assignor to Department of Natural Resources of the Province of Quebec, of Quebec Quebec, Canada" read -- assignor to Ministere des Richesses Naturelles, Province de Quebec, of Quebec, Quebec, Canada --; lines 12 and 13, for "Department of Natural Resources of the Province of Quebec, its successors" read -- Ministere des Richesses Naturelles, Province de Quebec, its successors --; in the heading to the printed specification, lines 3 to 5, for "assignor to Department of Natural Resources of the Province of Quebec, Quebec, Quebec, Canada" read -- assignor to Ministere des Richesses Naturelles, Province de Quebec, Quebec, Quebec, Canada --.

Signed and sealed this 4th day of August 1964.

(SEAL)
Attest:

ERNEST W. SWIDER
Attesting Officer

EDWARD J. BRENNER
Commissioner of Patents